July 1, 1958

J. J. DICKSON 2,841,018

QUICK RELEASABLE DRIVE

Filed April 12, 1955

INVENTOR.
James J. Dickson
BY
Roland A. Anderson
Attorney

July 1, 1958

J. J. DICKSON 2,841,018

QUICK RELEASABLE DRIVE

Filed April 12, 1955

INVENTOR.
James J. Dickson
BY
Roland A. Anderson
Attorney

United States Patent Office 2,841,018
Patented July 1, 1958

2,841,018

QUICK RELEASABLE DRIVE

James J. Dickson, Hollywood, Ill., assignor to the United States of America as represented by the United States Atomic Energy Commission Application April 12, 1955, Serial No. 501,007

3 Claims. (Cl. 74—25)

This invention relates to an apparatus for moving an object slowly in one direction and rapidly in the opposite direction.

It is well known in the field of neutronic reactors to provide a safety rod that is moved out of a reactor as operation of a reactor commences and is returned to the reactor to shut the reactor down when some emergency arises. It is highly desirable that the return of the safety rod be prompt, whereas the removal of the safety rod may take place slowly.

The apparatus of the present invention will carry out the above actions, i. e., move an object slowly in one direction and rapidly in the opposite direction. Such apparatus includes a spring that is loaded when the object is motor-driven slowly in one direction so that the occurrence of an emergency disconnects the motor and enables the loaded spring to move the object rapidly in the opposite direction.

Figure 1:
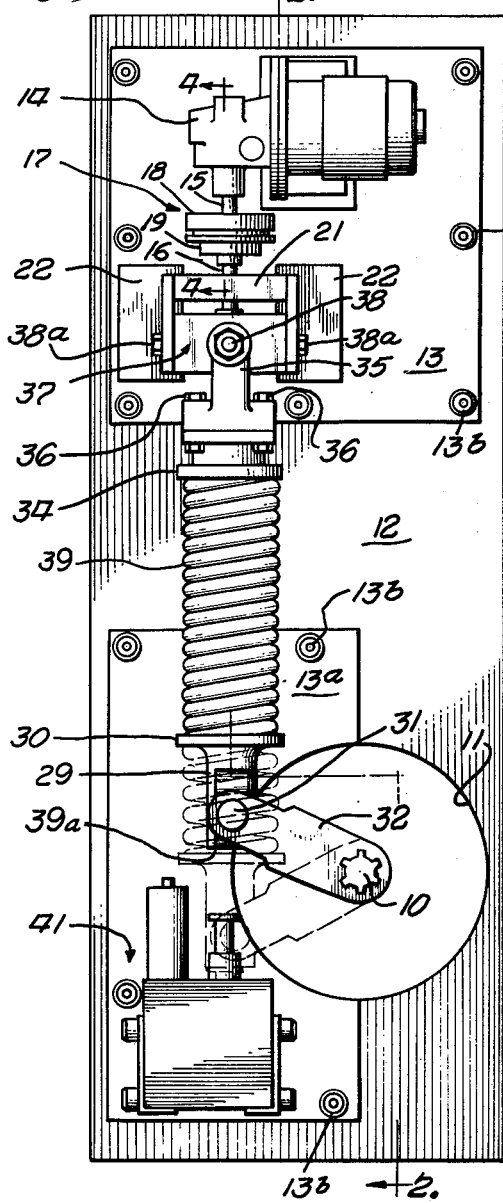
Fig. 1 is a side view of the apparatus of the present invention.
Figure 2:
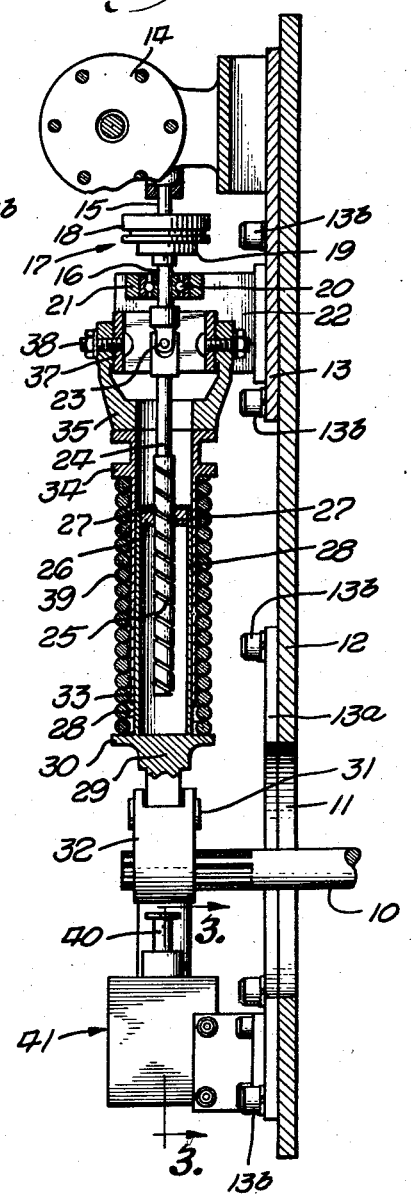
Fig. 2 shows the apparatus in an elevational view, partly in section, taken on the line 2—2 of Fig. 1.

The novel apparatus of the present invention may be employed for angularly shifting a safety rod through various positions with respect to a reactor. Neither the safety rod nor the reactor is shown, but the safety rod may be mounted upon a rock shaft 10, the end of which is shown in Figs. 1 and 2 to project through an opening 11 in a side plate 12. Mounting plates 13 and 13a are secured to the side plate 12 by means of screws 13b. To the mounting plate 13 there is secured a motor 14 which has a motor shaft 14a which rotates a driving shaft 15 by drive transmitted through reduction gears 15b and 15c, worm 15d, and worm wheel 15e, all housed in the motor casing. The worm 15d and worm wheel 15e permit the driving shaft 15 to be rotated by the motor but will not permit any external load upon the shaft to drive it.

The driving shaft 15 can be coupled to a driven shaft 16 by means of a magnetic clutch 17. The magnetic clutch comprises a driving part 18 which is keyed and secured to the motor shaft 15 and the driven part 19 which is keyed and secured to the driven shaft 16 so that there is always a clearance of a few thousandths of an inch between the clutch parts 18 and 19. The clutch 17 also includes a body 19a of nonmagnetizable friction material and an induction coil 19b, both carried by the driving part 18. Conventional slip-ring means or the like (not shown) permit conductors 19c and 19d to conduct current to the coil 19b for energizing the same. The driven shaft 16 is journaled in a bearing 20 carried in a part 21 secured to and between spaced brackets 22 which are secured to the mounting plate 13. The driven shaft 16 is connected by means of a universal joint 23 with a screw 24 which has a spiral groove 25. The screw 24 is engaged by a nut 26 which carries balls 27 which ride in the groove 25 of the screw. The arrangement of the spiral groove 25 and the balls 27 is such that an application of nonrotational axial force to the nut 26 results in axial movement of the nut when the screw is free to rotate and the rotation of the screw produces axial movement of the nut when the nut is held against rotation. The nut 26 is secured to and within an open end of an inner sleeve 28.

The opposite end of the sleeve 28 is closed by a head 29 which has an external shoulder 30 and which is pivotally connected by a pin 31 to an arm 32 keyed to the end of a rock shaft 10. The inner sleeve 28 is slidably mounted within an outer sleeve 33, which has an external shoulder 34 adjacent one end. This one end of the outer sleeve 33 is secured to a yoke 35 by means of bolts 36. The yoke 35 is pivotally connected to a rectangular frame 37 by bolts 38, and the frame is pivotally connected by bolts 38a to the brackets 22. The yoke and frame form a universal joint 35—37 which encompasses the universal joint 23 and connects the outer sleeve 33 to the brackets 22. A coil spring 39 is mounted on the external sleeve 33 and has its ends in engagement with the shoulders 30 and 34 so as to act against them.

Figure 3:
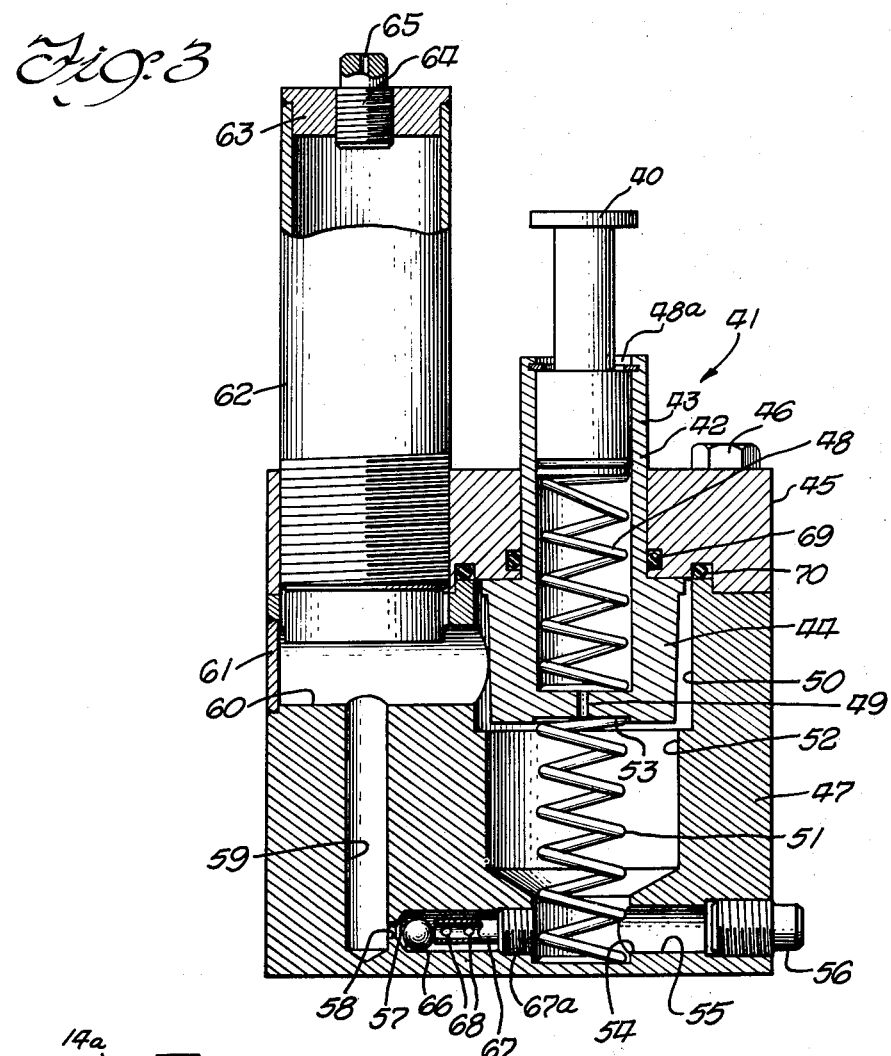
Fig. 3 is a vertical sectional view taken on the line 3—3 of Fig. 2 and showing a shock absorber employed with the apparatus of the present invention.
Figure 4:
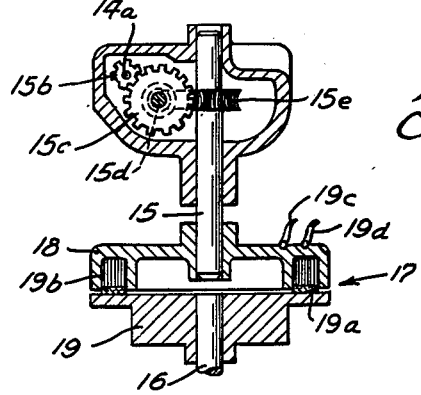
Fig. 4 is a sectional view taken on the line 4—4 of Fig. 1 and showing gears and a magnetic clutch used in the present apparatus.

The head 29 of the inner sleeve 28 has an end surface 39a which is engageable with a plunger 40 of a shock absorber 41 which is illustrated in detail in Fig. 3. As seen in this figure, the plunger 40 is slidably mounted in a plunger 42 which has a small-diameter portion 43 and a large-diameter portion 44. The plunger portion 43 is slidably mounted in a cover 45 which is secured by screws 46 to a body member 47 of the shock absorber 41. A spring 48 contained in the plunger 42 urges the plunger 40 upwardly against a retaining ring 48a in the upper end of the small-diameter portion 43 of the plunger 42. There is an opening 49 in the lower end of the large-diameter portion 44 of the plunger 42. In the position shown in Fig. 3, the large-diameter portion of the plunger 42 is in a large-diameter recess 50 formed in the body member 47, and can be forced against a spring 51 into a recess 52 which is aligned with the recess 50 and has a somewhat smaller diameter. The plunger portion 44 fits freely in the recess 50 as shown and, when the portion 44 is pushed into the recess 52, the clearance therebetween progressively decreases because of the external taper of the plunger 44.

The spring 51 has one end lodged in a recess 53 formed in the end of the plunger portion 44 and the other end in a recess 54 formed in the body member 47 as an axial extension of the recess 52 at a greatly reduced diameter. The body member 47 has a cross passage 55, which is closed at one end by a plug 56, goes across the recess 54, and terminates in a seat 57 in a small opening 58 which leads to the bottom of a vertical passage 59 formed in the body member 47. The upper end of the longitudinal passage 59 opens into a cross passage 60 which is closed at one end by a plate 61 and opens at its other end into the recess 50. A cylinder 62 which has a threaded connection with the cover 45 has an open lower end extending into the passage 60. The upper end of the cylinder carries a disk 63 in which is mounted a block 64 having a small or restricted opening 65. The cross passage 55 carries a ball valve 66 which is adapted to engage the seat 57 so as to close the opening 58 or to seat against one end of a tubular section 67 which is secured in the passage 55 by means of an enlarged threaded head formed at the opposite end of the section 67. The section 67 has a plurality of side openings 68. There is an annular seal 69 between the small diameter portion 43 of the plunger 42 and the cover 45. There is also an annular seal 70 between the cover 45 and the body member 47.

The shock absorber 41 is adapted to cushion movement of the arm 31 when it moves into the dotted-line position of Fig. 1. As this position is approached, the end surface 39 on the head 29 engages the plunger 40 to move it downward against the spring 48 and a suitable liquid such as oil contained in the body member 47. As the plunger 40 moves downward, it acts through the spring 48 to move the plunger 42 downward against the spring 51, and resistance to said downward movement increases as the large-diameter plunger 44 enters the recess 52, providing an increasingly smaller area for escape of oil from the recess 52 upwardly through the recess 50 and the passage 60 into the cylinder 62. As this goes on, the pressure of the oil moves the ball valve 66 against the seat 57, thus shutting off escape of oil from the recess 52 by way of the opening 58 and the passage 59. Thus there is considerable cushioning effect.

When the arm 32 moves away from the dotted-line position of Fig. 1, the springs 48 and 51 urge the plunger upwardly, and such upward movement can take place fairly rapidly because the passages 68 in the tubular section 67 allow oil to be drawn into the recess 52 to accommodate the large-diameter portion 44 of the plunger 42 retreating upwardly out of the recess 52, in spite of the fact that the ball valve 66 will seat against the end of the tubular section 67. The size of the restricted opening 65 in the plug 64 has some effect upon the rate at which the plunger 40 moves upward, because air must be sucked in through the opening 65 when the plunger moves upward.

In operation, the motor 14 may be employed to shift the arm 32 in both directions between the dotted-line and the full-line positions of Fig. 1. In this action the motor 14 rotates the arm shaft 15, the driven shaft 16, and the screw 24. Rotation of the screw 24 causes the nut 26 to move axially of the screw, and thus the inner sleeve 28 also moves longitudinally of the screw. When driving of the motor 14 is stopped, the arm 32 is retained in the position to which the motor has moved it, because as previously explained, the construction of the motor through a rotating force applied through the motor shaft 15. In the shifting of the arm 32 from the dotted-line position to the full-line position of Fig. 1, the safety rod that is connected with the shaft 10 is being moved out of the reactor so that the neutron absorption by the safety rod is decreased. In the aforesaid movement the shoulder 30 on the inner sleeve 28 is being moved toward the shoulder 34 on the outer sleeve 33, thereby causing the spring 39 to be compressed. Now when an emergency arises such as to require quick movement of the safety rod back into the reactor, the controls for the clutch 17 will automatically deenergize the clutch, thereby allowing the driven side 19 to rotate with respect to the driving side 18. In this event the compressed spring 39 acts to shift the inner sleeve 28 toward the left as viewed in Figs. 1 and 2 and thus to return the arm 32 to the dotted-line position of Fig. 1. Such movement can take place, because the arrangement of the balls 27 in the nut 26 and the spiral groove 25 on the screw 24 allows application of nonrotational axial force to the nut 26 to produce axial movement of the nut so long as the screw is free to rotate. Thus the spring 39 by expanding from its compressed condition quickly returns the safety rod to the reactor.

As previously stated, there is always a small clearance between the driving and driven parts 18 and 19 of the clutch 17. This clearance allows the driven side to rotate freely with respect to the driving side whenever the clutch is deenergized. When the safety rod is again to be moved out of the reactor by the motor 14, the clutch 17 need only be energized and the motor placed in operation. The driving and driven parts of the clutch 17 always have the same spacing from one another regardless of the position of the safety rod or of the arm 32 connected with the safety rod through the shaft 10. Thus only the reenergizing of the clutch 17 is necessary to make it possible for the motor 14 again to shift the safety rod; no repositioning of the clutch parts 18 and 19 with respect to one another is required.

The intention is to limit the invention only within the scope of the appended claims.

What is claimed is:

1. Apparatus for shifting an object slowly in one direction and rapidly in the opposite direction, said apparatus comprising a motor, a rotatable shaft, a clutch connecting the motor and the shaft, a screw connected to the shaft for rotation therewith, a nut engaging the screw, means connecting the nut and the object to hold the nut against rotation and to make the object shift in said one direction or the said opposite direction in response to movement of the nut along the screw produced by rotation of the screw, and a spring acting against the last mentioned means so as to be stressed in response to movement of the object in said one direction, whereby upon disengagement of the clutch the shaft and screw are free to rotate and the nut to move along the screw, thereby permitting the stressed spring to move the object in said opposite direction.

2. Apparatus for shifting an object slowly in one direction and rapidly in the opposite direction, said apparatus comprising a motor, a rotatable shaft, a magnetic clutch connecting the motor and the shaft, a screw connected to the shaft for rotation therewith, a nut engaging the screw, means connecting the nut and the object and including an inner sleeve carrying the nut in one end and having an external shoulder at the other end, an outer sleeve fitting over the inner sleeve and being connected at one end with a stop and having an external shoulder adjacent said one end, and a coil spring surrounding the sleeves and acting against the shoulders thereof so as to be compressed by decrease in the distance between the shoulders produced by movement of the object in the said one direction, whereby upon disengagement of the magnetic clutch the shaft and screw are free to rotate, thereby enabling the compressed spring to move the nut along the screw and to shift the object in the said opposite direction.

3. Apparatus for rocking a pivoted arm slowly in one direction and rapidly in the opposite direction, said apparatus comprising a motor, a rotatable shaft, a clutch connecting the motor and the shaft, a screw, a first universal joint connecting the shaft and the screw for causing the shaft to rotate the screw, a nut engaging the screw, an inner sleeve having an open end internally carrying the nut so as to hold it against rotation, a closed end pivotally connected to the arm, and an external shoulder near the closed end, an outer sleeve fitting over the inner sleeve and having an external shoulder, a second universal joint surrounding the first universal joint and connecting the outer sleeve to a fixed stop, and a coil spring surrounding the sleeves and acting against the shoulders thereof so as to be compressed by decrease in the distance between the shoulders produced by rocking of the arm in the said one direction, whereby the universal joints accommodate lateral shifting of the sleeves, the nut, and the screw produced by rocking of the arm, and upon disengagement of the clutch, the shaft and screw are free to rotate, thereby enabling the compressed spring to move the nut along the screw and to rock the arm in the said opposite direction.

References Cited in the file of this patent
UNITED STATES PATENTS

| 1,722,754 | Knauf | July 30, 1929 |
| 1,899,829 | Sarazin | Feb. 28, 1933 |
| 2,695,695 | Gilfillon et al. | Nov. 30, 1954 |

UNITED STATES PATENT OFFICE
CERTIFICATE OF CORRECTION

Patent No. 2,841,018                                            July 1, 1958

James J. Dickson

It is hereby certified that error appears in the printed specification of the above numbered patent requiring correction and that the said Letters Patent should read as corrected below.

Column 3, line 44, for "motor through" read -- motor is such as to prevent rotation of the motor through --.

Signed and sealed this 18th day of November 1958.

(SEAL)
Attest:

KARL H. AXLINE                                                  ROBERT C. WATSON
Attesting Officer                                          Commissioner of Patents